Aug. 17, 1971 YUTAKA HORI ET AL 3,600,268

SURFACE PROTECTING SHEET

Filed Nov. 17, 1967

INVENTORS:

YUTAKA HORI

ZENZO HONDA

YOICHI NOMURA

By Wenderoth, Lind & Ponack

ATTORNEYS

United States Patent Office 3,600,268 Patented Aug. 17, 1971

1

3,600,268

SURFACE PROTECTING SHEET

Yutaka Hori, Zenzo Honda, and Yoichi Nomura, Ibaraki, Japan, assignors to Nitto Electric Industrial Co., Ltd., Ibaraki, Japan Filed Nov. 17, 1967, Ser. No. 683,958
Int. Cl. C09j 7/02
U.S. Cl. 161—167 7 Claims

ABSTRACT OF THE DISCLOSURE

A surface protecting sheet according to the invention comprises a flexible plastic sheet (polyvinyl chloride, etc.) of a thickness of 0.20 to 0.02 mm. and a cured acrylic rubber layer not over 0.05 mm. thick on one surface thereof, said rubber layer being made by cross-linking a synthetic rubber consisting mainly of acrylic ester. A layer of low frictional resistance is preferably provided on the other surface of the flexible plastic sheet. The sheet is useful in protecting the surface of a plate, sheet, etc. of metal or the like while affording a view of such surface. The present sheet has high resistance to light and weather, does not tend to adhere to the protected surface when removed therefrom, and is sufficiently strong to resist pressures applied to the metal sheet or the like during deep drawing, press-binding, roll forming, etc., without tear or damage.

This invention relates to a surface protecting sheet or the like which, when applied to the surface of a polished or finished smooth surface such as of metal, will give surface protection with durability even when the so protected metal plate or sheet is press-worked.

There has been proposed to protect the surface of a body (plate, sheet, etc.) of a metal or other material by applying thereto a pressure-sensitive adhesive sheet made by coating a paper or plastic support sheet with a pressure sensitive adhesive. However, this kind of pressure-sensitive adhesive sheet has a defect that, when it is delaminated, removed or peeled off from the surface after it has been used for the purpose of the surface (e.g. of metal, glass or plastic sheet or plate) protection, the pressure-sensitive adhesive will often remain on the surface so that no clean separation can be obtained. Specifically, in case it is used for the surface protection of a building material made of a metal, it will be often left to stand out of doors for a long time during the work until the building is completed, with a result that the adhesive material is deteriorated due to exposure to light and to the atmosphere, so that a considerable part of the adhesive will remain on the surface when the protective sheet is separated from the surface. Thus, a trouble will be required to remove the adhesive later to clean the surface.

It is desirable to provide a transparent surface protective sheet because any surface defect or the like can be observed through the sheet without removal of the sheet which is required in the case of an opaque surface protective sheet. Such a transparent protective sheet can be produced coating a transparent base or support sheet with a transparent pressure sensitive adhesive layer. However, such transparent surface protecting material is so high in the light-permeability due to the transparency and accordingly is so likely to cause the light-deterioration of the pressure-sensitive adhesive that the latter will tend to remain on the metal surface when the protective sheet is delaminated or separated from the surface.

Therefore, an object of the present invention is to provide an improved surface protecting sheet high in the resistance to light or weather.

2

Another object of this invention is to provide a transparent surface protecting surface which has improved resistance to light and weather.

It is another object of this invention to provide a surface protecting sheet which has less tendency to remain on the surface when it is delaminated or separated from said surface.

It is still another object of this invention to provide a surface protecting sheet which remains durable without tear or damage even when the metal sheet applied with the protecting sheet is subjected to severe working such as deep drawing, press-bending, roll forming, etc.

It is still another object of this invention to produce a surface protecting sheet which can readily be printed on its surface.

Other objects, features and advantages of this invention will be apparent from the following description which will be made partly by referring to the accompanying drawings wherein.

Figure 1:
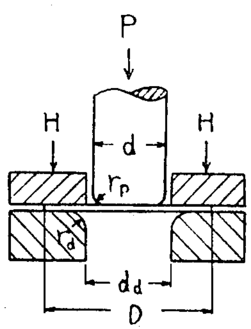
FIG. 1 is a schematic view of a Swift deep draw tester.

Briefly, a surface protecting sheet of this invention comprises a flexible plastic sheet of a thickness of 0.02–0.20 mm. and a cured acrylic rubber layer on one face of the plastic sheet, said rubber layer being not higher than 0.05 mm. in thickness and made by crosslinking a synthetic rubber consisting mainly of acrylic ester. According to a preferable embodiment of the invention, a layer of a low frictional resistance is provided on the other surface of said flexible plastic sheet.

For the flexible plastic sheet of a thickness of 0.20 to 0.02 mm. to be used as a base for the surface protecting sheet of the present invention is used such thermoplastic sheet as polyvinyl chloride, copolymer of vinyl chloride with a minor proportion of other vinyl monomer(s), polyvinylidene chloride, polypropylene or polyethylene. It is desirable that this sheet is transparent so that any defect, dust or the like on the metal surface which would cause inconvenience or difficulty in metal working process can be directly observed through the protecting sheet. However, in case transparency is not always required, e.g. for the protection of a decorative plate, mirror surface or the like, the surface protecting sheet may well be opaque or translucent. The thickness of this base sheet should be 0.02–0.20 mm. If the thickness of this sheet is more than 0.20 mm., the cost will become high and at the same time the sheet metal working will be impossible due to the restriction of the clearance of the press die. If it is less than 0.02 mm., the protective sheet on the sheet metal will tend to be torn or damaged during the sheet metal working process.

The synthetic rubber having an acrylic ester as a main constituent and to be used for the adhesive layer of the present invention is a rubbery substance of an acrylic ester polymer or copolymer of at least 50 mol percent acrylic ester with one or more ethylenically unsaturated monomers, and having a Mooney viscosity (according to ASTM D1646–63) of 20 $ML_{1+4}$ at 100° C. Such rubber material is used usually for rubber moldings having such special object as oil-proofness or for the waterproofing treatment of umbrellas, tents and the like.

The above mentioned acrylic ester is obtained generally by the esterification of acrylic acid with an alkyl alcohol of less than 12 carbon atoms as, for example, methanol, ethanol, propanol, n-butanol, n-amyl alcohol, n-heptanol, n-octanol, n-decanol, iso-amyl alcohol, 1-methyl pentanol, 2-methyl pentanol, 3-methyl pentanol, 2-ethyl butanol or isooctanol. When the acrylic ester content in the rubber is less than 50 mol percent, the desired elasticity, weather resistance and adhesiveness will not be attained.

Examples of ethylenically unsaturated monomers to be copolymerized with an acrylic ester are acrylonitrile, acrylic acid, methacrylic acid, methacrylate, maleic anhydride, itaconic acid, allyl alcohol, butadiene, isoprene or chloroprene.

For such synthetic rubber having an alkyl ester, as its main constituent can be used any of commercial ones such as Leocoat (produced by Leo Chemical Co., Ltd.), Toa Acrone (produced by Toa Paint Co., Ltd., Japan) and Teisan Rubber (produced by Teikoku Chemical Industries, Co., Ltd., Japan).

Any known curing agent may be used to cure or crosslink such acrylic rubber layer. Typical examples of curing agent are such organic peroxides as benzoyl peroxide, dicumyl peroxide, etc. In case an acid radical or alcohol radical is contained in the copolymer composition, polyfunctional compounds such as butyl etherified melamine, butyl etherified urea or isocyanate resin may be mixed with the rubber and heated for the cure. If desired, a cured acrylic rubber layer may be formed after an undercoating has been applied to the plastic sheet in advance.

The thin layer of the cured acrylic rubber as an adhesive layer of the protective sheet of the present invention does not substantially require such auxiliary agents as a tackifying agent and softening agent as in an ordinary pressure-sensitive adhesive. However, it is sometimes desirable to incorporate a small amount of a plasticizer to adjust the wettability of the acrylic adhesive layer. The cured acrylic rubber layer formed on the plastic sheet is itself lower in the plastic deformability than the usual pressure-sensitive adhesive. However, its thickness should be not more than 0.05 mm. or preferably not more than 0.03 mm. in order to avoid excess plastic fluidity caused by the action of an extremely large force applied at the time of metal working. The thickness of more than 0.05 mm. will be not only undesirable to the economy but will cause the surface protecting sheet to break or tear at the time of metal working.

In forming a cured acrylic rubber layer on a plastic base sheet, a solution of the rubber dissolved in a proper organic solvent and added with a crosslinking or curing agent, and the mixture is applied on the surface of the plastic sheet and dried and heated to cause curing of the rubber.

In the surface protecting sheet of the present invention, in order to further improve the press workability, it is preferable to provide a low friction layer for reducing the frictional resistance and further elevating the lubricatability in the outermost layer of said sheet to be in direct contact with the metal working die. For this low frictional resistance layer any suitable lubricant having a low surface energy may be used. However, as the present surface protecting sheet is preserved or transported generally as rolled up in a roll, it is preferable to use such an agent which can form a thin film which would enable easy unrolling or unwinding of the sheet even when the said surface film is in direct contact with the adhesive layer on the other surface in the rolled state. Examples of such material suitable for forming the low frictional resistance layer are those used for the nontackifying treating agent for the back surface of a conventional pressure-sensitive adhesive tape, more particularly a resin or rubber having dimethyl polysiloxane as a main constituent or a copolymer containing octadecyl acrylate, methacrylate, octadecyl vinyl ester or octadecyl vinyl ether in the molecule. By providing such low frictional resistance or lubricating layer on the top surface of the protective sheet a lubricating effect at the time of metal working will be obtained and the metal workabiilty will be improved.

The surface protecting sheet of the present invention may be applied to the surface of a metal or other article (e.g. plate, sheet, etc.) desired to be protected. In applying the protective sheet to the surface to be protected, any suitable apparatus used for applying conventional pressure-sensitive adhesive sheets can be employed.

When the protective sheet is applied to the surface of an article, the surface is protected against the formation of crack, flow or other defect by external force. Since the protective sheet is light and weather resistance even transparent, the acrylic rubber adhesive is not deteriorated even after a prolonged period of time so that the protective sheet can be clearly separated from the surface. The protective sheet of this invention can be made transparent without causing deterioration due to exposure to light, the defect, if any, on the article surface can be observed directly through the sheet. The most important feature of the protective sheet of this invention is that it has durability even under severe metal working condition and accordingly can protect the metal surface during such metal working. The term "metal working," "plate metal working" or the like as used in this specification includes press deep drawing, press bending and multistep roll forming works and their modifications for working various metal plates or sheets and includes also so-called metal plastic working for forming various metal shaped articles.

One of the features of the present invention is that, even in a press deep drawing work in which such extremely large force as about 1000 tons/m.$^2$ is applied to a surface protecting sheet on a metal plate or sheet, the protective sheet will show durability and will not be damaged or broken. It is surprising that the surface protective sheet can withstand such severe metal working condition. A conventional pressure-sensitive adhesive sheet with paper as the base material can not conform to the plastic deformation of the metal during the working, and accordingly will be broken. Even in a metal plate or sheet to which is applied a surface protecting pressure-sensitive adhesive sheet with a flexible plastic sheet as the base material, the protecting sheet will be broken or damaged with increase of the draw ratio, the metal surface in a remarkably deformed part will be hurt and the adhesive will remain on the surface when the protective sheet is separated from said surface.

We have investigated the reason why a flexible plastic film can not conform to the plastic deformation of the metal and will break at the time of press working, and have found that the plastic fluidity of the pressure-sensitive adhesive part on the plastic sheet is so high that the plastic sheet will wrinkle and break. We have further found that the cured acrylic rubber mentioned hereinbefore is low in plastic fluidity and is useful as an adhesive material for surface protective plastic sheet, which would not be damaged on a metal plate which is subjected to severe metal working to form an article of a complicated shape.

The above mentioned cured acrylic rubber layer has no such stickiness as of usual pressure-sensitive adhesive and is such as will have the stickiness hardly felt even if pushed with a finger tip. However, when the cured acrylic rubber layer is brought into contact with a polished or finished flat smooth metal plate and is pressed thereagainst with a roll pressure or the like, it will be bonded on the metal surface without the help of heat or a solvent. The bondage is so strong as is required for the purpose of surface protection. When its 180-degree peeling test based on the ordinary pressure-sensitive adhesive tape testing method is carried out, its adhesion is 30 to 150 g./cm. width. This is sufficient for the purpose of surface protection. Further, this cured acrylic rubber layer is high in the resistance to light and weather, so that even if the surface protecting sheet having this rubber layer is transparent or is left stand long out of doors, on adhesive layer will remain on the protected surface to stain it when the protective sheet is separated from the surface. For example, when a protective sheet of this invention as applied on the surface of a stainless steel plate is subjected to an ageing test in a Weather-O-Meter tester for 300 hours and then the protective sheet is removed it can clearly be separated and nothing will remain on the stainless steel plate.

When a low frictional resistance layer is provided on the other side (top face) of the plastic sheet, a lubricatability will be given to the metal surface and the workability of the metal plate will be increased.

Further, the surface protecting sheet of the present invention may be used to protect the surface of not only a polished metal plate but also a plastic decorative plate, plastic plywood or mirror, to protect the surface.

For evaluating the above mentioned workability, a Swift deep drawing test may be employed. According to this test, the maximum drawing ratio of an SPC first class bright steel plate of a thickness of 1 mm. provided in JIS G3310 is 2.06, while the maximum drawing ratio of the same steel plate to which is applied a surface protecting sheet of the present invention is about 2.2 to 2.4 showing a remarkable improvement of the workability.

The present invention will be illustrated by the following examples in which all parts are by weight. The Swift deep drawing test and tack test were conducted in the following standard manners respectively.

Swift deep drawing test (FIG. 1)

This is a test adopted by International Deep Drawing Research Group (I.D.D.R.G.) and is carried out according to the method described in pp. 203–205 of The Sheet Metal Industries, vol. 34, 1957 by O. H. Kemis. As shown in FIG. 1, a flat bottomed punch P (50 mm. in diameter) is employed to determine the maximum metal disk diameter D that can be drawn without breakage. The workability is evaluated by the ratio $D/d$ wherein $d$ is the punch diameter. The ratio $D/d$ is called maximum drawing ratio. The die diameter $d_d$ is 53.64 mm. and the die shoulder roundness radium $r_d$ is 13.0 mm.

Figure 2:
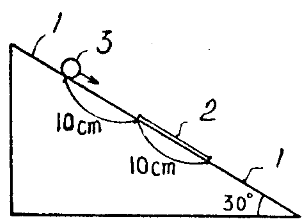
FIG. 2 is an explanatory view of a tack test.

Tack testing method (FIG. 2)

This test is carried out according to that described in The Proceedings of the Institution of Rubber Industry, vol. 1, No. 105, 1954 by J. Dow. Thus, referring to FIG. 2, a surface protecting sheet 2 of a length of 10 cm. is fixed with the adhesive layer facing up, on a nonadhesive flat smooth plate 1 having an angle of 30 degrees. A steel ball 3 of a diameter varying from 1/32 to 1 inch at intervals of 1/32 inch is made to slide from 10 cm. away from the upper end of the sheet and the tackiness is measured with the diameter of the largest steel ball stopping on the sheet. For convenience same, it is represented by a tack number which is 1 for the ball of a diameter of 1/32 inch and is 32 for the ball of a diameter of 1 inch. When typical commercial pressure-sensitive adhesive tapes were measured by using such tack numbers, there were shown values of 25 to 28 for adhesive plasters, 12 to 15 for cellophane adhesive tapes and 17 to 20 for paper adhesive tapes.

EXAMPLE 1

A transparent film (0.05 mm. thick) was made by extruding, in the usual manner, a composition of 100 parts of a polyvinyl chloride (polymerization degree of 1100), 32 parts of dioctyl phthalate, 0.6 part of cadmium stearate and 0.6 part of barium stearate. One surface of this flexible transparent film was coated with a rubber solution which is a mixture of 100 parts of an acrylic rubber (Leocoat R–1000 produced by Leo Chemical Co., Ltd., a ternary copolymer of an acrylic ester, acrylonitrile and acrylic acid; Mooney viscosity of 45 $ML_{1+4}$ at 100° C.), 5 parts of butylated urea, 20 parts of dioctyl phthalate and 700 parts of toluene. The other surface of the flexible transparent film was coated with a low friction treating solution consisting of 100 parts of silicone rubber (KS–705 produced by Shinetsu Chemical Co., Ltd., Japan), 5 parts of a cross-linking agent (PS–1 produced by Shinetsu Chemical Co., Ltd., Japan) and 10,000 parts of toluene. Then the coated film was dried at about 100° C. and then heated to 150° C. to accelerate the cross-linking of the acrylic rubber. The amounts of the coating materials were so adjusted that the thickness of the cured acrylic rubber layer becomes 0.02 mm. and the thickness of the low friction layer becomes less than 1 micron.

The cured rubber surface of the thus obtained surface protecting sheet was bonded by being pressed with a roller onto a stainless steel plate (JIS G 3405 SUS 27 CP). The protective sheet had a transparency sufficient to allow the observation of the metal surface so that any surface defect could be easily detected. Its adhesion by the ordinary 180-degree peeling test was 90 g./cm. width. Thus the surface protecting sheet had an adhesiveness necessary and sufficient for the plate metal working. Its tack number was about 1 to 2 showing substantially no tackiness.

Then the surface protective sheet on the steel plate was subjected to light resistance test with a Weather-O-meter by irradiating for 300 hours. There was no noticeable change in the performance of the protective sheet. When the protecting sheet was separated from the steel plate the cured acrylic rubber layer did not remain at all. As a control, the same test with the Weather-O-Meter was made in respect of a commercial pressure-sensitive adhesive tape having a transparent soft polyvinyl chloride as a support. A remarkable deterioration of the pressure-sensitive adhesive was observed within only 3–10 hours and the adhesive remained considerably on the steel plate when the sheet was separated from the steel plate.

In order to evaluate the metal plate workability, Swift deep drawing tests were conducted in respect of the surface protecting sheet of this example and the conventional pressure-sensitive adhesive sheet which were applied on a JIS G 3310 SPC first class bright steel plate. The results were as in Table 1.

TABLE 1

| | Blank test | Example 1–1 | Example 1 | Conventional product A | Conventional product B |
|---|---|---|---|---|---|
| D | 10.31 | 11.17 | 11.75 | 10.31 | 10.40 |
| Maximum drawing ratio D/d | 2.06 | 2.23 | 2.42 | 2.06 | 2.08 |

Blank test: No protecting sheet was used.

Example 1–1: Example in which low friction layer was omitted from the sheet of Example 1.

Conventional product A: A pressure sensitive adhesive tape comprising a paper sheet (0.12 mm. thick) provided with a pressure sensitive adhesive layer (0.04 mm. thick) of a natural rubber latex. Product of an American company A.

Conventional product B: A pressure sensitive adhesive tape comprising a paper sheet (0.12 mm. thick) provided with a pressure sensitive adhesive layer (0.04 mm. thick) of a natural rubber latex. Product of an American company B.

EXAMPLE 2

A flexible transparent film 0.12 mm. thick was made of a mixed composition consisting of 100 parts of a polyvinyl chloride (polymerization degree of 1300), 40 parts of dioctyl phthalate, 0.8 part of cadmium stearate, 0.8 part of barium stearate and a small amount of a blue transparent dye, by using an ordinary calender roll. One surface of this transparent film was coated with an acrylic rubber solution of 100 parts of acrylic rubber (Toa Acrone SA–100 produced by Toa Paint Co., Ltd., Japan; an acrylic rubber obtained by copolymerizing an acrylic ester, acrylonitrile and another monomer containing a hydroxyl radical and of a Mooney viscosity of 30 $ML_{1+4}$ at 100° C.), 10 parts of Dismodule L-75 (an isocyanate compound produced by Farbfabriken Bayer A. G., Germany) and 500 parts of toluene. The other surface of the film was coated with the low friction treating solution used in Example 1. The coated film was dried and heated and was then rolled up into a roll to obtain a blue transparent surface protecting sheet, with a thickness of the cured acrylic rubber layer of 0.015 mm. and a thickness of the low friction layer of 1 micron. The adhesion of this surface protecting sheet to a stainless steel plate (SUS 27 CP) of a thickness of 1 mm. as measured by the 180-degree peeling test was 50 g./cm. width, its tack number was about 1 to 2 and its adhesion to a finger was little felt. As a result of the Swift deep drawing test, its maximum drawing ratio was found to be 2.39. In case no low friction layer was formed, the maximum drawing ratio was 2.22.

When the above mentioned stainless steel plate surface protected by this protecting sheet was deep drawn with a press to be in the form of a pouring mouth of a thermos bottle, the deep drawing work of the complicated form was possible without producing any defect on the surface of the stainless steel plate at the time of working. After three months, the protecting sheet was separated but no residue was seen on the surface of the metal. For comparison, when a pressure-sensitive adhesive protecting paper marketed as Protect-Mask #6100 produced by Mystic Co., U.S.A. was applied to the same stainless steel plate and the steel plate was formed into the same form of the pouring mouth of the thermos bottle, not only the protecting paper but also the stainless steel plate was broken.

Further, when a commercial pressure-sensitive adhesive tape made of a soft polyvinyl chloride for packing was applied to the same stainless steel plate and the steel plate was formed to be in the same form as in the above, the polyvinyl chloride film was broken where the plastic deformation was large and a deep hurt was formed in the stainless plate. Further, even when the protective sheet was separated just after the working, a large amount of the residue of the pressure-sensitive adhesive was seen on the steel plate surface.

EXAMPLE 3

One surface of a vinylidene chloride film of a thickness of 0.07 mm. made by an ordinary extruding method was coated with an acrylic rubber solution of a mixture of 100 parts of an acrylic rubber (Teisan Rubber #1000 produced by Teikoku Chemical Industries Co., Ltd., Japan; an emulsion polymer consisting of 85 parts of butyl acrylate and 15 parts of acrylonitrile and of a Mooney viscosity of 38 $ML_{1+4}$ at 100° C.), 5 parts of benzoyl peroxide and 570 parts of toluene so that the thickness after drying becomes 0.01 mm. The other surface of the same film was coated with a polymerization composition obtained by polymerizing a mixture of 5 mols of acrylonitrile monomer, 1 mol of octadecyl vinyl ester monomer and benzoyl peroxide in an amount of 0.2 mol percent on the total amount of the monomers in a toluene solution, so that the thickness after drying becomes 0.002 mm. The coated film was dried and heated and was then rolled up into a roll to obtain a surface protecting sheet.

The adhesion of this protecting sheet to a stainless steel plate as measured by the 180-degree peeling test was 110 g./cm. width. The surface tackiness of the cured acrylic rubber layer was such as to be felt very weak when pushed with a finger. The plate was high in the workability. According to the Swift deep drawing test, the maximum drawing ratio was 2.41 and, even in case there was no low friction layer, the value as 2.27. This fact indicates that by using this surface protective sheet the workability of a metal plate or sheet can be improved much higher than with the conventional pressure-sensitive adhesive sheet.

This protecting sheet was applied to a stainless steel plate (JIS G 4305 SUS 240 CP) by using a rubber roller at the normal temperature and the surface-protected steel plate was roll-formed into a spandrel with 12-step forming rolls. The spandrel was used for the outside equipment of a building and was exposed with this protecting sheet out of doors for 4 months until the construction of the building was completed. When the protecting sheet was removed, no residue was seen at all on the surface of the spandrel and the separation was easy with cleanness.

EXAMPLE 4

In emulsion-copolymerizing 105 parts of butyl acrylate and 9.5 parts of acrylonitrile, an emulsified mixture consisting of 267 parts of water, 0.58 part of sodium laurate, 0.58 part of ammonium peroxide and 0.11 part of sodium metabisulfite was prepared, and the respective materials of the above mentioned proportions were put into a reactor and were emulsion-polymerized at a bath temperature of 50° C. while being severely stirred. In 5 hours, the reaction was completed. In order to recover the polymer, the polymerization product was added into a saturated aqueous solution of sodium sulfate to precipitate the polymer. Then the precipitate was well washed with water and was dried for 24 hours in a thermostatic dryer at 80° C. The acrylic rubber produced by the above mentioned method was a white elastic substance of a Mooney viscosity of 24 $ML_{1+4}$ at 100° C.

An acrylic rubber solution prepared by adding 5 parts of dicumyl peroxide and 500 parts of toluene to 100 parts of the above prepared acrylic rubber was applied to one surface of the same polyvinyl chloride film of a thickness of 0.12 mm. as in Example 2 so that the thickness of the coated layer after drying becomes 0.01 mm. The coated film was heated and dried and was at the same time cured to form a cured acrylic rubber layer. The adhesion of this surface protecting sheet to the stainless steel plate by the 180-degree peeling test showed a value of 80 g./cm. width, its tack number was 2 and its tackiness felt by a finger was very weak. The result of Swift deep drawing test showed a value of 2.23. Further, a protecting sheet made by forming a low friction layer about 1 micron thick by using the same low friction treating solution having silicone as a main agent as in Example 1 on the back surface of this surface protecting sheet was of a maximum drawing ratio of 2.41.

When the above mentioned surface protecting sheet as applied to a stainless steel plate (SUS 27 CP) was subjected to a light resistance test with a Weather-O-Meter for 300 hours, irrespective of whether the low friction treated layer was present or not, no cured acrylic rubber layer was seen to remain on the stainless steel plate when the sheet was separated from the steel plate.

EXAMPLE 5

A polyethylene film of a thickness of 0.09 mm. was treated with a corona discharge so as to be adhesive and the same cured acrylic rubber layer and low friction layer as in Example 1 were provided on it to obtain a surface protecting sheet.

When this protecting sheet was applied to a JIS G 3310 SPC second class bright steel plate (2 mm. thick) and the plate was press-formed into an automobile bumper, substantially no hurt was produced on the surface of the steel plate and the polishing step for the final finish was reduced to be ⅙ as compared with the case of using no protecting sheet.

What we claim is:

1. A surface protective sheet which comprises a flexible plastic sheet of 0.02 to 0.20 mm. in thickness and an adhesive layer of a thickness not higher than 0.05 mm. provided on one face of said plastic sheet, said adhesive layer comprising a cured acrylic rubber and having an adhesion of 30 to 150 g./cm. wherein said acrylic rubber, before being cured, has a Mooney viscosity of not less than 20 $ML_{1+4}$ (100° C.) and comprises a copolymer of at least 50% of an ester of acrylic acid and ethylenically unsaturated monomer selected from the group consisting of acrylonitrile, acrylic acid, methacrylic acid, maleic anhydride, itaconic acid, allyl alcohol, butadiene, isoprene and chloroprene.

2. A surface protective sheet according to claim 1 wherein a low frictional resistance layer is provided on the other surface of the flexible plastic sheet.

3. A surface protective sheet as claimed in claim 1 wherein the acrylic ester is an ester of acrylic acid with an alcohol having not higher than 12 carbon atoms.

4. A sheet according to claim 1 wherein a curing agent which is an organic peroxide is employed.

5. A sheet according to claim 1 wherein the flexible plastic sheet is polyvinyl chloride and the adhesive layer is a ternary copolymer of an acrylic ester, acrylonitrile and acrylic acid.

6. A sheet according to claim 1 wherein the flexible plastic sheet is vinylidene chloride and the acrylic rubber adhesive is prepared by copolymerizing butyl acrylate with acrylonitrile.

7. A sheet according to claim 1 wherein the flexible plastic sheet is vinyl chloride and the acrylic rubber is prepared by copolymerizing butyl acrylate with acrylonitrile.

References Cited

UNITED STATES PATENTS

| | | | |
|---|---|---|---|
| 2,884,126 | 4/1959 | Ulrich | 161—406X |
| 2,053,011 | 9/1936 | Schulz et al. | 161—Vinyl Dig. |
| 2,364,875 | 12/1944 | Schieman | 117—68.5 |
| 2,572,877 | 10/1951 | Morris et al. | 161—Vinylidene Dig. |
| 2,790,732 | 4/1957 | McGarry et al. | 117—122 |
| 2,872,366 | 2/1959 | Kiernan et al. | 161—218X |
| 3,086,904 | 4/1963 | Uhleen | 161—216X |
| 3,380,938 | 4/1968 | Mistley et al. | 161—254 |

FOREIGN PATENTS

| | | | |
|---|---|---|---|
| 7,539 | 1961 | Japan | 117—122 |
| 13,238 | 1963 | Japan | 117—122 |
| 895,989 | 5/1962 | Great Britain | 117—122 |
| 870,679 | 6/1961 | Great Britain | 117—122 |

WILLIAM A. POWELL, Primary Examiner

U.S. Cl. X.R.

117—122; 161—216, 406